US008972149B2

(12) United States Patent
Herold et al.

(10) Patent No.: US 8,972,149 B2
(45) Date of Patent: Mar. 3, 2015

(54) CONTROL SYSTEM IMPLEMENTING DERATE BASED ON AIR CHARACTERISTICS

(75) Inventors: Robert A. Herold, Peoria, IL (US); Chad A. Moore, Chillicothe, IL (US); James V. Dornberger, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 1163 days.

(21) Appl. No.: 12/913,304

(22) Filed: Oct. 27, 2010

(65) Prior Publication Data

US 2012/0109487 A1 May 3, 2012

(51) Int. Cl.
*G06F 19/00* (2011.01)
*F02D 41/02* (2006.01)

(52) U.S. Cl.
CPC .......... *F02D 41/021* (2013.01); *F02D 2200/04* (2013.01); *F02D 2200/101* (2013.01); *F02D 2200/701* (2013.01)
USPC .......................................................... 701/102

(58) Field of Classification Search
CPC ........................... F02D 41/025; F02D 41/1456
USPC .......................... 701/109, 102, 110; 73/31.01
See application file for complete search history.

(56) References Cited

U.S. PATENT DOCUMENTS

| | | | | |
|---|---|---|---|---|
| 6,450,411 | B1 * | 9/2002 | Rash et al. | 236/44 A |
| 6,633,800 | B1 | 10/2003 | Ward et al. | |
| 7,392,151 | B2 | 6/2008 | Mäkelä | |
| 7,974,658 | B2 * | 7/2011 | Hunziker | 455/561 |
| 7,980,183 | B2 * | 7/2011 | Meltser et al. | 105/26.05 |
| 8,241,181 | B2 * | 8/2012 | Moriya et al. | 477/111 |
| 2006/0190165 | A1 | 8/2006 | Makela et al. | |
| 2007/0027612 | A1 | 2/2007 | Barfoot et al. | |
| 2008/0201054 | A1 | 8/2008 | Grichnik et al. | |
| 2009/0062971 | A1 | 3/2009 | Rottig et al. | |
| 2009/0160604 | A1 * | 6/2009 | Nguyen | 340/5.2 |
| 2010/0013594 | A1 | 1/2010 | Komine et al. | |

FOREIGN PATENT DOCUMENTS

WO WO 2005/003875 1/2005

* cited by examiner

*Primary Examiner* — Stephen K Cronin
*Assistant Examiner* — Robert Werner
(74) *Attorney, Agent, or Firm* — Finnegan, Henderson, Farabow, Garrett & Dunner, LLP

(57) ABSTRACT

A control system for a machine is disclosed. The control system may have an engine configured to combust a mixture of fuel and air and generate a mechanical power output and a flow of exhaust, and a sensor configured to generate a signal indicative of the machine moving between zones having different air characteristics. The control system may also have a controller in communication with the engine and the sensor. The controller may be configured to selectively adjust operation of the engine based on the signal in an amount related to the air characteristics.

20 Claims, 1 Drawing Sheet

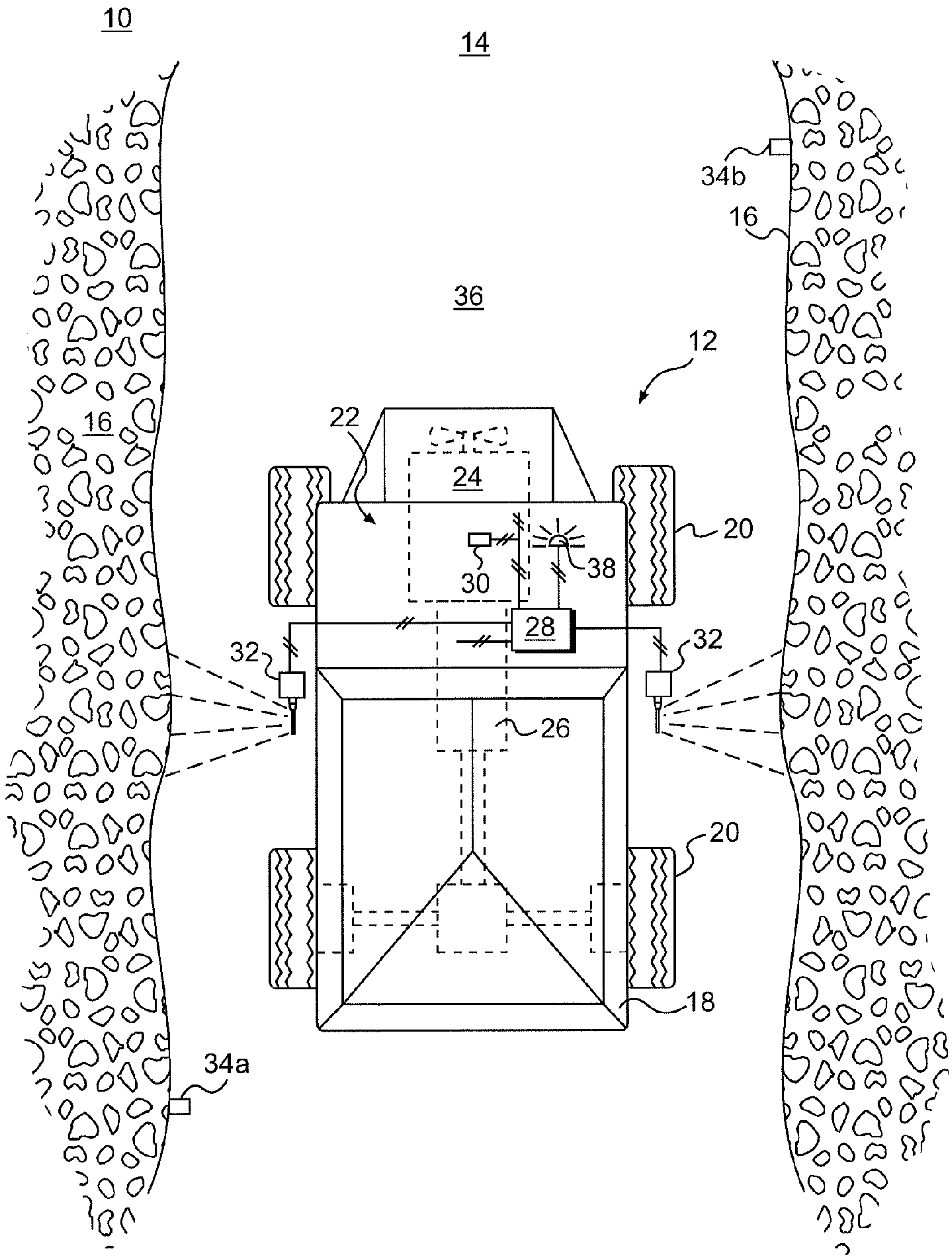
10
14
34b
16
36
12
22
16
24
20
30
38
28
32
32
26
20
18
34a

CONTROL SYSTEM IMPLEMENTING DERATE BASED ON AIR CHARACTERISTICS

TECHNICAL FIELD

The present disclosure relates generally to a control system and, more particularly, to a control system for a mobile machine that implements engine derate based on an environmental air characteristic.

BACKGROUND

Machines such as, for example, haul trucks, drills, loaders, conveyors, and other types of heavy equipment are commonly used in underground mining applications to perform a variety of tasks. Some of these tasks involve carrying or pushing material through long tunnels that have environmental conditions that vary along their lengths. These environmental conditions can include, among other things, a low quality or low supply rate of air found at mid-portions of the tunnels. When passing through these tunnels, care should be taken such that the conditions at the mid-portions do not cause machine malfunctions or create situations unsuitable for prolonged human occupation. One precaution currently implemented includes manually reducing machine performance in certain tunnel sections such that the environmental conditions in those sections do not degrade below acceptable levels. Another precaution includes banning certain machines from particular tunnel sections. Both of these precautions are undesirable, however, as they tend to increase operator responsibility, generate opportunities for error, and lower productivity. Accordingly, another way to account for varying environmental conditions in particular work zones is desired.

U.S. Patent Publication No. 2009/0160604 (the '604 publication) of Nguyen that published on Jun. 25, 2009 describes a vehicle speed control system that automatically affects vehicle operation based on a vehicle location relative to a designated speed control zone. Specifically, the '604 publication describes a system that includes a computer for controlling operating functions of a vehicle when RFID tags onboard the vehicle are sensed by an offboard station positioned adjacent the designated speed control zone. The offboard station is capable of sending a speed control command to the vehicle as the vehicle passes through the speed control zone, thereby causing components of the vehicle to automatically reduce the speed of the vehicle. The components reduce the speed of the vehicle by reducing vehicle fueling.

Although the system of the '604 publication may automatically reduce vehicle speed in a designated control zone, the speed reduction may have an insignificant effect on air consumption or quality within the zone. In addition, by controlling only vehicle fueling, inefficiencies may be realized. Further, the system of the '604 publication may only function in zones equipped with the offboard station, which can be limiting and expensive.

The disclosed control system is directed to overcoming one or more of the problems set forth above and/or other problems of the prior art.

SUMMARY

In one aspect, the present disclosure is directed to a control system for a machine. The control system may include an engine configured to combust a mixture of fuel and air and generate a mechanical power output and a flow of exhaust, and a sensor configured to generate a signal indicative of the machine moving between zones having different air characteristics. The control system may also include a controller in communication with the engine and the sensor. The controller may be configured to selectively adjust operation of the engine based on the signal in an amount related to the air characteristics.

In another aspect, the present disclosure is directed to another control system for a machine. This control system may include an engine configured to combust a mixture of fuel and air and generate a mechanical power output and a flow of exhaust, and a sensor configured to generate a signal indicative of the machine moving between zones having different air characteristics. The control system may also include a controller in communication with the engine and the sensor. The controller may be configured to determine a number of other machines currently in at least one of the zones, and to selectively adjust operation of the engine based on the signal and based on the number of other machines currently in at least one of the zones.

In yet another aspect, the present disclosure is directed to a method of controlling a machine. The method may include making a first determination that the machine has moved between zones having different air characteristics, and making a second determination of a number of other machines currently in at least one of the zones. The method may further include selectively derating the machine based on the first and second determinations.

BRIEF DESCRIPTION OF THE DRAWINGS

FIG. 1 is a pictorial illustration of an exemplary disclosed machine control system.

DETAILED DESCRIPTION

FIG. 1 illustrates a worksite 10 and an exemplary machine 12 performing a task at worksite 10. Worksite 10 may include, for example, a mine site, a landfill, a quarry, a construction site, or another type of worksite having a roadway 14 traversable by machine 12. In some applications, roadway 14 may be bordered on at least one side by a wall 16, for example a wall of an underground tunnel. Although shown in FIG. 1 as a single lane roadway, it is contemplated that roadway 14 may alternatively include multiple lanes, if desired.

The task being performed by machine 12 may be associated with altering the geography at worksite 10 and include, for example, a hauling operation, a grading operation, a leveling operation, or a bulk material removal operation. As such, machine 12 may embody a mobile machine, for example a haul truck, a motor grader, or a loader. Machine 12 may include, among other things, a body 18, one or more traction devices 20 that support body 18 and propel machine 12, and a control system 22 that produces and controls a power output used to drive traction devices 20.

Control system 22 may include a collection of components that cooperate to produce the power output directed to traction devices 20. Specifically, control system 22 may include a power source 24, a transmission 26, and a controller 28 in communication with power source 24 and transmission 26. Controller 28 may be configured to selectively regulate operation of power source 24 and transmission 26 in response to various input to drive traction devices 20 and propel machine 12 in a desired manner.

Power source 24 may include an internal combustion engine having multiple subsystems that cooperate to produce the power output discussed above. Although power source 24 is depicted and described as a four-stroke diesel engine, one skilled in the art will recognize that power source 24 may be any other type of internal combustion engine such as, for example, a gasoline or a gaseous fuel-powered engine. The subsystems included within power source 24 may include, for example, a fuel system, an air induction system, an exhaust system, a lubrication system, a cooling system, and/or any other appropriate system. Any or all of these subsystems may be controlled by controller 28 to adjust an amount of or manner in which air and/or fuel is directed into and combusted within power source 24 and thereby the mechanical power output produced by power source 24.

Power source 24 may be configured to operate at one or more rated conditions. For the purposes of this disclosure, the rated conditions may be considered the conditions under which power source 24 produces advertised power (e.g., operates at optimum performance along an advertised lug curve). Power source 24 may be derated by reducing an amount of fuel and/or air combusted within power source 24 and/or by adjusting a manner in which the fuel and air is combusted (e.g., by adjusting a timing of power source 24). When derated, power source 24 may produce power at a level less than advertised.

A speed sensor 30 may be associated with power source 24 to sense an output speed thereof. In one example, speed sensor 30 may embody a magnetic pickup type of sensor associated with a magnet embedded within a rotational component of power source 24 such as a crankshaft or a flywheel. During operation of power source 24, speed sensor 30 may sense the rotating field produced by the magnet and generate a signal corresponding to the rotational speed of power source 24.

Transmission 26 may embody a hydrostatic transmission, an electric transmission, a mechanical transmission, or any other type of transmission known in the art. Transmission 26 may be configured to receive a rotational input from power source 24 and produce a rotational output having a different speed and torque directed to traction devices 20. Transmission 26 may be selectively shifted by controller 28 to adjust the ratio between the input and output speeds and torques. It is contemplated that transmission 26 may be capable of any number of different ratios in a forward and a reverse travel direction. The structure of transmission gears, input members, output members, coupling members, and the connections therebetween can be achieved using components known in the art.

Controller 28 may embody a single or multiple microprocessors, field programmable gate arrays (FPGAs), digital signal processors (DSPs), etc., that include a means for controlling operations of power source 24 and transmission 26 in response to signals received from speed sensor 30 and from one or more environmental sensors 32 mounted, for example, on an external surface of machine 12. Numerous commercially available microprocessors can be configured to perform the functions of controller 28. It should be appreciated that controller 28 could readily embody a microprocessor separate from that controlling other machine-related functions, or that controller 28 could be integral with an machine microprocessor and be capable of controlling numerous machine functions and modes of operation. If separate from the general machine microprocessor, controller 28 may communicate with the general machine microprocessor via datalinks or other methods. Various other known circuits may be associated with controller 28, including power supply circuitry, signal-conditioning circuitry, actuator driver circuitry (i.e., circuitry powering solenoids, motors, or piezo actuators), and communication circuitry.

Environmental sensor 32 may be attached, for example, to a side of machine 12 and configured to generate a signal indicative of movement of machine 12 between zones 36 having different environmental air characteristics. In one embodiment, environmental sensor 32 may embody a radio frequency identification (RFID) receiver configured to detect radio waves generated by one or more RFID tags 34 and generate a corresponding signal. In the disclosed embodiment, pairs of RFID tags 34, including a first RFID tag 34*a* and a second RFID tag 34*b*, may be placed at boundaries between zones 36 having substantially different air characteristics. It should be noted that zones 36 may have zone-wide average air characteristics that are substantially different from each other, even though air characteristics at the boundaries of zones 36 may, in some situations, be nearly identical. In the disclosed example, first and second RFID tags 34*a, b* are placed at spaced apart locations alongside roadway 14, for example in wall 16, in a tunnel ceiling, in roadway 14 itself, or in another location. In this manner, as machine 12 traverses roadway 14, environmental sensor 32 may detect RFID tags 34*a, b* and alert controller 28 when machine 12 crosses the corresponding boundary between zones 36. It is contemplated that information about a particular zone 36 (e.g., the air characteristics of that zone 36 or air use limitations associated with the characteristics) may also be transmitted from RFID tags 34*a, b* to environmental sensor 32 as machine 12 passes by, if desired. It is also contemplated that any number of RFID tags 34 may be utilized to demarcate each zone 36.

It is contemplated that, instead of RFID tags 34 only demarcating a boundary of zone 36, RFID tags 34 may alternatively be placed at consistent intervals within zone 36. As long as environmental sensor 32 regularly detects RFID tags 34, machine 12 may be considered to be operating within zone 36 or outside of zone 36, as desired. When sensor 32 fails to detect an RFID tag 34, machine 12 may be considered to have left or entered zone 36. In some embodiments, a time or distance buffer may be utilized to account for a missing or faulty RFID tag 34, if desired. Additionally or alternatively, RFID tags 34 may be regularly placed along an entire length of roadway 14, with some RFID tags 34 providing different information regarding the location of or air characteristics of zone 36.

The air characteristics of each zone 36 may be include at least one of a known air quality and a known air supply rate. In particular, as described above, some locations within long mining tunnels may be poorly ventilated. As a result, the quality of air at these locations may make the locations unsuitable for prolonged human occupation. Additionally or alternatively, the supply rate of air to these locations may be less than machine 12 or a group of co-located machines 12 together is capable of consuming at rated conditions. For this reason, these locations may be periodically tested for the air characteristics and separated into zones 36 identified by RFID tags 34 according to specific levels of air quality and supply rate and/or according to corresponding use limitations. RFID tags 34 may then be used to alert machine 12 of zone boundaries or locations and, in some embodiments, also inform machine 12 of the corresponding air characteristics and/or use limitations.

It is contemplated that environmental sensor 32 may embody a sensor other than an RFID receiver, if desired. For example, environmental sensor 32 could be associated with a locating device such as a GPS receiver, an odometer, an optical scanner, a camera, etc. that provides machine positional information to controller 28. Based on this information and a stored map of zones 36, controller 28 may then be configured to determine when machine 12 crosses boundaries between zones 36 and thereby the corresponding associated are characteristics and/or use limitations. In yet another example, environmental sensor 32 could be configured to directly detect the quality and/or quantity of available air at locations along roadway 14, if desired, and according to one or more preprogrammed algorithms determine when machine 12 crosses between zones 36 (i.e., when machine 12 moves between locations having significantly different air characteristics) and the corresponding use limitations.

Controller 28 may be configured to adjust performance of machine 12 based on signals from environmental sensor 32. Specifically, controller 28 may be configured to derate machine 12 when machine 12 is determined to be operating within a zone 36 having less desirable air characteristic. For example, when controller 28 detects the presence of first RFID tag 34*a* and machine 12 crosses the corresponding boundary into a zone 36 having a low quality or supply rate of air and associated use limitations, controller 28 may communicate with the subsystems of power source 24 to reduce an amount of torque in the mechanical output provided to transmission 26 (i.e., to reduce a power output of power source 24). In one example, controller 28 may communicate with the fuel system of power source 24 to reduce fueling and thereby reduce the output of power source 24. It is contemplated, however, that controller 28 may also or alternatively communicate with other subsystems of power source 24, for example the air induction system, if desired, to accomplish the torque reduction of power source 24. When controller 28 detects the presence of second RFID tag 34*b* and machine 12 crosses the boundary out of the zone 36 having the less desirable air characteristic, controller 28 may stop or reduce the torque reduction of power source 24 (i.e., controller 28 may return operation to rated conditions). Controller 28 may derate machine 12 by a desired amount such that emissions from machine 12 do not further reduce the air quality in zone 36 below an acceptable level and/or such that an air consumption rate of machine 12 does not exceed an acceptable threshold amount of the air supply rate within zone 36.

The amount of torque reduction affected by controller 28 when machine 12 is operating in zone 36 may be variable and based on several different factors. In one example, controller 28 may reference the air characteristic of a particular zone 36 with a lookup map stored in memory and determine a desired torque reduction for the particular host machine 12. Controller 28 may then reference the signal from speed sensor 30 with the same or another lookup map and determine a reduction in fueling corresponding with the current engine speed of power source 24 and the desired torque reduction. Controller 28 may also be configured to determine a number and/or type of other machines 12 currently operating within zone 36, and determine the desired torque reduction and corresponding fueling reduction such that the combined operation of all machines 12 in zone 36 complies with restrictions associated with the air characteristics.

Controller 28 may also be configured to control transmission 26 based on signals from environmental sensor 32. Specifically, controller 28 may include stored in memory two or more different shift maps relating engine speed and transmission shift points. When it is determined that machine 12 is operating within a zone 36 having a less desirable air characteristic, controller 28 may utilize a first of the shift maps to control the gear ratio of transmission 26 and, when it is determined that machine 12 is operating outside of that particular zone 36, controller 28 may use a second of the shift maps. The two shift maps may include different engine speed settings for use as shift points between gear ratios. In one example, the first shift map may have shift points that occur at relatively lower engine speeds compared to the second shift map. By controlling transmission 26 differently based on zones 36, travel speeds of machine 12 may be maintained more consistently with operator expectations and transmission shifting may be relatively smooth even with reduced engine output.

Controller 28 may further be configured to generate an alert of operation within a zone 36 having a less desirable air characteristic. Specifically, controller 28 may be configured to illuminate a warning lamp 38 or activate another similar device informing an operator of machine 12 that RFID tag 34*a* has been detected and/or that machine derating has begun. Similarly, controller 28 may stop illuminating warning lamp 38 when RFID tag 34*b* has been detected and/or when machine derating has been stopped. It is contemplated that an operator, when alerted by controller 28, may have the opportunity to override or otherwise adjust the machine derating, if desired.

INDUSTRIAL APPLICABILITY

The disclosed control system may be applicable to any mobile machine where a quality and/or supply rate of air in an environment of the machine is a concern. The disclosed control system may be particularly applicable to underground mining applications, where the machine operates in long tunnels with compromised ventilation. Operation of control system 22 will now be described.

During travel of machine 12 along roadway 14, machine 12 may pass by RFID tags 34 placed, for example, in walls 16 of an underground tunnel. As described above, RFID tags 34 may demarcate the boundaries between and/or locations of zones 36 having different air characteristics. For example, a first zone 36 may have a lower air quality and/or a lower supply rate of air than an adjoining second zone 36. If unaccounted for, normal machine operation within first zone 36 could degrade the quality of air below an acceptable level, consume all or too much of the available air, or result in malfunction because of insufficient air.

Accordingly, as machine 12 passes first RFID tag 34*a*, environmental sensor 32 may detect the presence of first RFID tag 34*a* and generate a corresponding signal directed to controller 28. In some embodiments, first RFID tag 34*a* may provide information regarding the air characteristic of first zone 36, for example the current air quality, the current air supply rate, an emission limit, an air consumption limit, and/or a desired machine operating level. Controller 28, upon receiving the signal from environmental sensor 32, may make a determination that machine 12 has entered first zone 36 and derate machine 12 by a corresponding amount. That is, controller 28 may reduce a fueling of power source 24, reduce a charge air supply of power source 24, and/or adjust a timing (e.g., fuel injection or valve timing) of power source 24, and affect transmission shifting between gear ratios according to the air characteristics of first zone 36 and a number and/or type of other co-located machines 12 such that operation of machine 12 remains within desired limits. Controller 28 may also illuminate warning lamp 38 at this time.

As machine 12 passes second RFID tag 34*b*, environmental sensor 32 may detect the presence thereof and generate a corresponding signal directed to controller 28. In some embodiments, second RFID tags 34*b*, in addition to signaling an end boundary of zone 36, may also provide an indication as to the air characteristic of the adjoining zone 36. That is, it is contemplated that different areas having varying levels of low air quality and/or supply may exist near each other. In this situation, RFID tags 34 may be placed between these areas providing information as to the different air quality and supply levels and/or to the desired machine operation within the different areas. Controller 28, upon receiving the signal from environmental sensor 32, may make a determination that machine 12 is leaving first zone 36 and either return machine operation to rated conditions or adjust machine operation (i.e., increase or decrease the derating of machine 12 by a desired amount) according to the air characteristic in the new area that machine 12 is entering. If entering a new area of sufficient air quality and supply, controller 38 may stop illuminating warning lamp 38 at this time.

Several benefits may be associated with the disclosed control system. For example, because controller 28 may affect machine operation based on the air characteristic of a particular zone 36, an air quality and/or machine operation within zone 36 may be maintained at a desired level. Further, by controlling transmission operation also based on the air characteristic and on derated power source operation, machine performance, efficiency, and productivity may remain high. Further, by locating environmental sensor 32 onboard machine 12 and RFID tags 34 offboard, any number of relatively inexpensive RFID tags 34 may be located along roadway 14 without significant additional cost, thereby allowing machine operation to be adjusted as many times as necessary during a single trip of machine 10 along roadway 14.

It will be apparent to those skilled in the art that various modifications and variations can be made to the control system of the present disclosure. Other embodiments of the method and system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A control system for a machine, comprising:

an engine configured to combust a mixture of fuel and air and generate a mechanical power output and a flow of exhaust;

a sensor configured to generate a signal indicative of the machine moving between zones having different air characteristics; and a controller in communication with the engine and the sensor and configured to:

determine at least one of a number and a type of other machines currently operating in the same one of the zones as the machine; and selectively adjust operation of the engine based on the signal in an amount related to the air characteristics and based on at least one of the number and the type of other machines currently operating in the same one of the zones as the machine.

2. The control system of claim 1, wherein the sensor is an RFID receiver configured to detect a first RFID tag mounted at a boundary between the zones.

3. The control system of claim 1, wherein the controller is configured to derate the engine when the machine enters one of the zones having a less desirable air characteristic.

4. The control system of claim 3, further including an engine speed sensor, wherein the controller is configured to reference an engine speed sensed by the engine speed sensor and the air characteristics with a relationship map stored in memory to determine an engine output reduction based on the signal.

5. The control system of claim 1, further including a transmission operatively connected to and driven by the engine, wherein the controller is in further communication with the transmission and configured to adjust a gear ratio of the transmission based on the signal.

6. The control system of claim 5, wherein the controller includes stored in memory a first transmission shift map corresponding to machine operation in a first of the zones, and a second transmission shift map corresponding to machine operation in a second of the zones.

7. The control system of claim 1, wherein the air characteristics include at least one of a quality and a supply rate of air within the zones.

8. The control system of claim 7, wherein:

the controller is configured to determine a reduction in engine output corresponding to a desired engine consumption rate of air less than the supply rate of air within at least one of the zones; and the selectively adjusted operation is based on the reduction in engine output.

9. The control system of claim 8, wherein the controller is further configured to determine the reduction in engine output such that the combined operation of the machine and the other machines operating in the same one of the zones complies with at least one restriction associated with the air characteristics.

10. A control system for a machine, comprising:

an engine configured to combust a mixture of fuel and air and generate a mechanical power output and a flow of exhaust;

a sensor configured to generate a signal indicative of the machine moving between zones having different air characteristics; and a controller in communication with the engine and the sensor and configured to:

determine a number of other machines currently in at least one of the zones; and selectively adjust operation of the engine based on the signal and based on the number of other machines currently in at least one of the zones.

11. The control system of claim 10, wherein the sensor is an RFID receiver configured to detect a first RFID tag mounted at a boundary between the zones.

12. The control system of claim 10, wherein the controller is configured to derate the engine when the machine enters one of the zones having a less desirable air characteristic.

13. The control system of claim 12, further including an engine speed sensor, wherein the controller is configured to reference an engine speed sensed by the engine speed sensor and the air characteristics with a relationship map stored in memory to determine an engine output reduction based on the signal.

14. The control system of claim 10, further including a transmission operatively connected to and driven by the engine, wherein the controller is in further communication with the transmission and configured to adjust a gear ratio of the transmission based on the signal.

15. The control system of claim 14, wherein the controller includes stored in memory a first transmission shift map corresponding to machine operation in a first of the zones, and a second transmission shift map corresponding to machine operation in second of the zones.

16. The control system of claim 10, wherein the air characteristics includes at least one of a quality and a supply rate of air within the zones.

17. The control system of claim 16, wherein:

the controller is configured to determine a reduction in engine output corresponding to a desired engine consumption rate of air less than the supply rate of air within at least one of the zones; and the selectively adjusted operation is based on the reduction in engine output.

18. A method of controlling a machine, comprising:

making a first determination that the machine has moved between zones having different air characteristics;

making a second determination of a number of other machines currently in at least one of the zones; and selectively adjusting operation of an engine of the machine based on the first and second determinations.

19. The method of claim 18, further including adjusting a gear ratio of the machine based on the first determination.

20. The method of claim 18, wherein the air characteristic includes at least one of a quality and a supply rate of air.

* * * * *